(12) United States Patent
Naitou

(10) Patent No.: US 7,777,556 B2
(45) Date of Patent: Aug. 17, 2010

(54) SEMICONDUCTOR INTEGRATED CIRCUIT AND SEMICONDUCTOR APPARATUS INTEGRALLY HAVING SEMICONDUCTOR INTEGRATED CIRCUIT

(75) Inventor: Mutsuhiro Naitou, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 124 days.

(21) Appl. No.: 12/050,486

(22) Filed: Mar. 18, 2008

(65) Prior Publication Data
US 2008/0231349 A1 Sep. 25, 2008

(30) Foreign Application Priority Data
Mar. 19, 2007 (JP) ............................. 2007-071386

(51) Int. Cl.
*G05F 1/10* (2006.01)
*G05F 3/02* (2006.01)
(52) U.S. Cl. ....................................... 327/530; 327/544
(58) Field of Classification Search ................. 327/530, 327/544; 365/226, 227
See application file for complete search history.

(56) References Cited

U.S. PATENT DOCUMENTS

| 5,917,765 | A | * | 6/1999 | Morishita et al. | ........... | 365/201 |
| 6,275,439 | B1 | * | 8/2001 | Lee | ............................. | 365/226 |
| 6,434,078 | B1 | * | 8/2002 | Morishita | .................... | 365/227 |
| 7,383,138 | B2 | * | 6/2008 | Ito et al. | ....................... | 702/60 |

OTHER PUBLICATIONS

"90nm CMOS ASIC Reference Design Flow,"FIND*, vol. 22, No. 5, pp. 47-51, Sep. 2004 *FIND: a technology information magazine for users of Fujitsu Limited.

* cited by examiner

*Primary Examiner*—Quan Tra
(74) *Attorney, Agent, or Firm*—Arent Fox LLP

(57) ABSTRACT

A semiconductor integrated circuit includes a first power supply whose potential is controlled under control operation from an external control circuit, a second power supply whose potential is controlled under control operation from the external control circuit, and whose potential can be set independently of the first power supply, a first power-supply system comprising a circuit driven by the first power supply, a second power-supply system comprising a circuit driven by the second power supply, and a connecting circuit that performs connecting operation between a first high-potential line of the first power-supply system and a second high-potential line of the second power-supply system in response to a potential-matching signal indicating that the first power-supply system and the second power-supply system are operated by the same potential from the external control circuit.

6 Claims, 12 Drawing Sheets

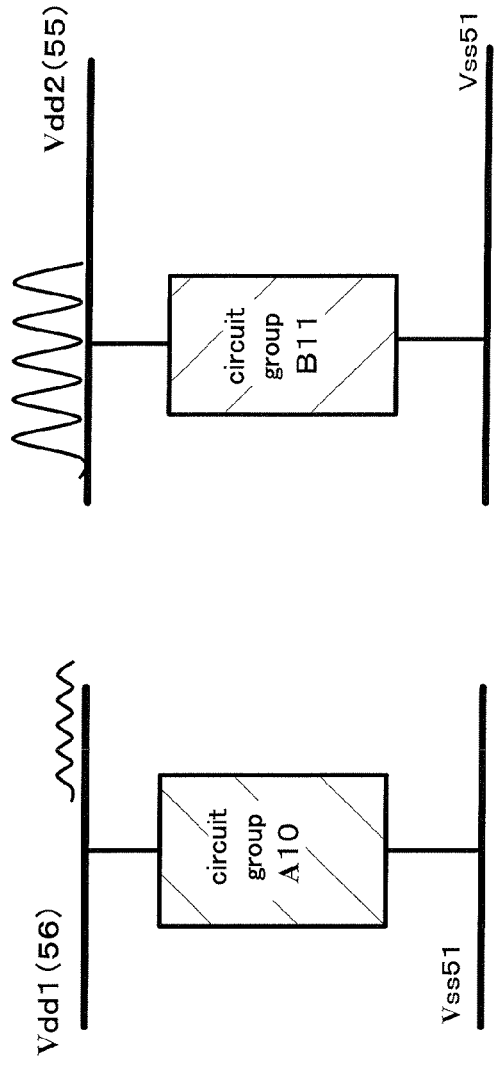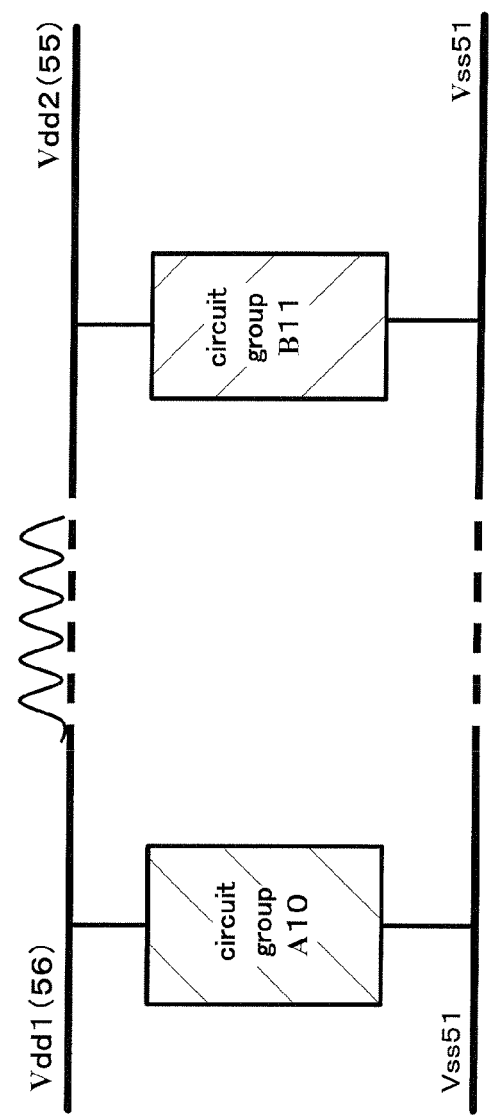

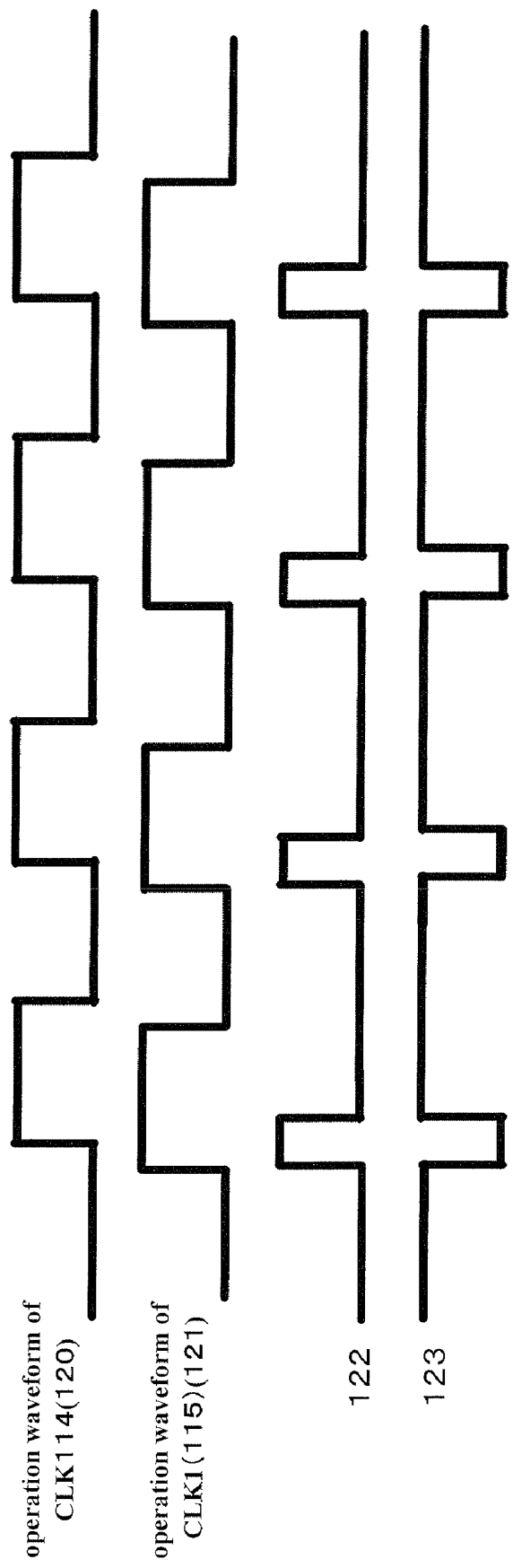

SEMICONDUCTOR INTEGRATED CIRCUIT AND SEMICONDUCTOR APPARATUS INTEGRALLY HAVING SEMICONDUCTOR INTEGRATED CIRCUIT

TECHNICAL FILED

This is relates to a semiconductor integrated circuit and a semiconductor device integrally having the semiconductor integrated circuit.

BACKGROUND

It is required to reduce the power consumption for an LSI (Large Scale Integration) used for a mobile device, and it is required to improve the performance for an LSI used for a mobile device.

Then, realizing the optimization and low power consumption supplied to an LSI circuit by arranging a plurality of power supply systems in an LSI circuit in which potentials of the power supply systems can be independently set, and by controlling potentials of the power supply systems in accordance with the operation situation of the LSI circuit.

Further, the above-mentioned optimization is performed by DC/DC converters corresponding to the power supply systems in the LSI for supplying power to the LSI and a controller for controlling the plurality of the DC/DC converter.

Herein, in the optimization in accordance with the operation situation of the LSI, such operations are properly executed that power is supplied only to an operation circuit, a low voltage is applied to a circuit to which a low operation-frequency is required, and a rated voltage is supplied to a circuit to which processing is performed with high load.

However, if a plurality of power supply systems exists in the LSI circuit and voltages of the power supply systems are controlled as mentioned above, a mechanism for suppressing the voltage change is required for the power supply systems. Because by reducing parasitic capacitance connected to the power supply systems, by dividing the power supply systems, the voltage of the power supply systems are easily affected by the voltage change from another power supply system. Further, if the parasitic capacitance connected to the power supply systems becomes low level, it takes a long time to stabilize the voltage upon raising the voltage in the power supply system for processing with high load.

Then, it is proposed that a capacitance cell that is sufficient to stabilize the voltage, i.e., suppress the power noise is calculated and is inserted between a high-voltage power supply and a low-voltage power supply in the power supply systems (e.g., refer to Technical information magazine "FIND" Vol. 22 No. 5 in 2004 for user of Fujitsu Limited (pages 47 to 51)).

According to Technical information magazine "FIND" Vol. 22 No. 5 in 2004 for user of Fujitsu Limited, it is proposed that, in consideration of operations and signal delay of components in the devices in the LSI due to the power noise, the amount of capacitance cells best to suppress the power noise is calculated and is inserted in the LSI. Then, it is possible to ensure the compensation capacitance to suppress the voltage change best to the operations of the devices in the LSI.

SUMMARY

According to an aspect of an embodiment, a semiconductor integrated circuit includes a first power supply whose potential is controlled under control operation from an external control circuit, a second power supply whose potential is controlled under control operation from the external control circuit, and whose potential can be set independently of the first power supply, a first power-supply system comprising a circuit driven by the first power supply, a second power-supply system comprising a circuit driven by the second power supply, and a connecting circuit that performs connecting operation between a first high-potential line of the first power-supply system and a second high-potential line of the second power-supply system in response to a potential-matching signal indicating that the first power-supply system and the second power-supply system are operated by the same potential from the external control circuit.

BRIEF DESCRIPTION OF THE DRAWINGS

FIGS. 9A and 9B are diagrams showing noises of a high-potential line and a low-potential line of the power supply system connected to one circuit group and the power supply system connected to another circuit group.

FIG. 12 is a diagram showing operation waveforms of a connecting circuit according to the second embodiment.

DESCRIPTION OF THE PREFERRED EMBODIMENTS

Figure 1A:
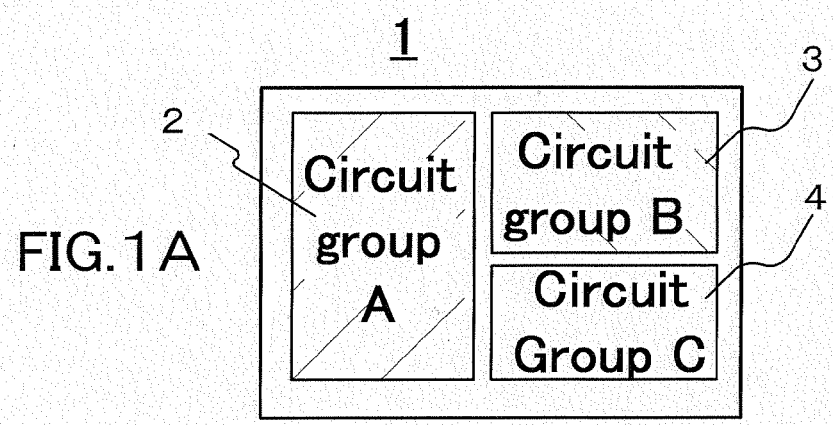
FIGS. 1A to 1D are diagrams showing a power supply system of an LSI, an example of applying a voltage in the power supply system, and the LSI according to the first embodiment.

The following will describe first and second embodiments.

The first embodiment relates to a semiconductor integrated circuit comprising: an LSI having a plurality of power supply systems that can independently set potentials thereof and a connecting circuit for connecting the plurality of power supply systems; a power supply circuit that supplies power to the plurality of power supply systems; and a circuit that controls the power supply circuit.

The first embodiment will be described with reference to FIGS. 1A to 1D, FIGS. 2 to 8, and FIGS. 9A and 9B.

FIGS. 1A to 1D are diagrams showing the LSI, the power supply systems in the LSI, and an example of applying a voltage in the power supply system according to the first embodiment.

FIGS. 1A to 1D show an LSI 1 having a plurality of power supply systems, a circuit group A2, a circuit group B3, a circuit group C4, a DC/DC converter 9, a circuit group A10, a circuit group B11, a connecting circuit 12, a switch 13, a switch control circuit 16, a DC/DC converter 14, a ground potential line Vss 51, a high-potential line Vdd 1 (56), and a high-potential line Vdd 2 (55).

Referring to FIG. 1A, the LSI 1 has a plurality of power supply systems. Further, the LSI 1 comprises a power supply system connected to the circuit group A2, another power supply system connected to the circuit group B3, and other power supply system connected to the circuit group C4.

Furthermore, the circuit groups A2, B3, and C4 form the LSI 1.

The circuit group A2 comprises, e.g., a memory circuit such as an SRAM (Static Random Access Memory) and a logic circuit having a pause period. Therefore, there are many chances to change power voltages of the circuit group A2. For the purpose of contribution to the reduction in consumption current, the above change in power voltage includes off-operation of power. Further, even if changing the power voltage, the operation of the circuit group A2 is guaranteed. Thus, such parasitic capacitance is arranged that the power voltage is not changed by the current consumed by the circuit group A2.

The circuit group B3 comprises a CPU and an image data processing logic circuit. Although the circuit group B3 is always operated, the change in operating ratios thereof is high. Therefore, the power of the circuit group B3 is not OFF. However, there are many chances for changing the power voltages of the circuit group B3 for the purpose of reducing the power consumption.

The circuit group C4 comprises a circuit to which stable operation is always required, such as a circuit for generating clocks of the entire LSI 1. Therefore, a power voltage of the circuit group C4 is not changed.

The power supply system comprises a circuit group that is driven by a power supply when LSI 1 is drived by a plurality of power supplies.

Figure 1B:
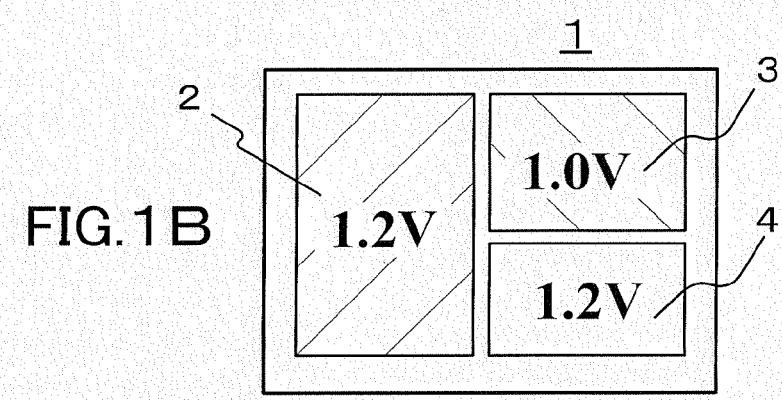

FIG. 1B shows a power applying state 5. In case of the power applying state 5, the power supply system connected to the circuit group A2 supplies 1.2V, another power supply system connected to the circuit group B3 supplies 1.0V, and other power supply system connected to the circuit group C4 supplies 1.2V. Further, in the power applying state 5, the LSI 1 externally obtains data. That is, the high operation ratio and the above-mentioned power voltage are required for the circuit group A2 including the memory circuit such as an SRAM. Since the operation ratio is low level in the circuit group B3 including the CPU, the circuit group B3 can be operated at the above-mentioned low power voltage. Moreover, the circuit group C4 including a clock generating circuit keeps the normal operation-ratio, and the circuit group C4 therefore requires the above-mentioned power voltage.

Figure 1C:
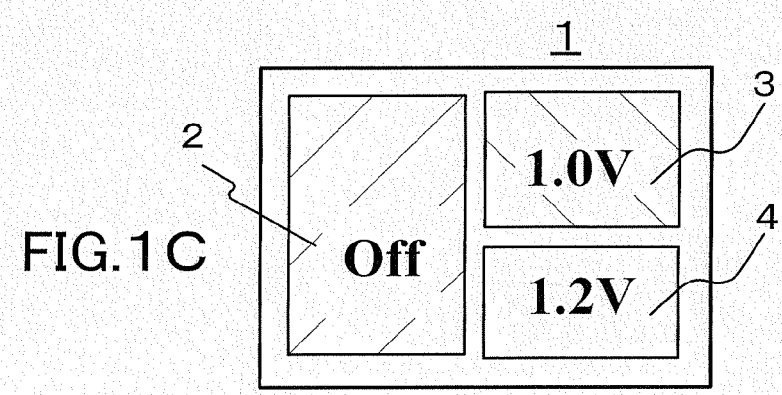

FIG. 1C shows a power applying state 6. In case of the power applying state 6, the power supply system connected to the circuit group A2 is turned OFF and another power supply system connected to the circuit group B3 supplies 1.0 V, and other power supply system connected to the circuit group C4 supplies 1.2 V. Further, in the power applying state 6, the LSI 1 pauses. That is, when the circuit group A2 and B3 are paused, only the circuit group C4 keeps the operation state.

Figure 1D:
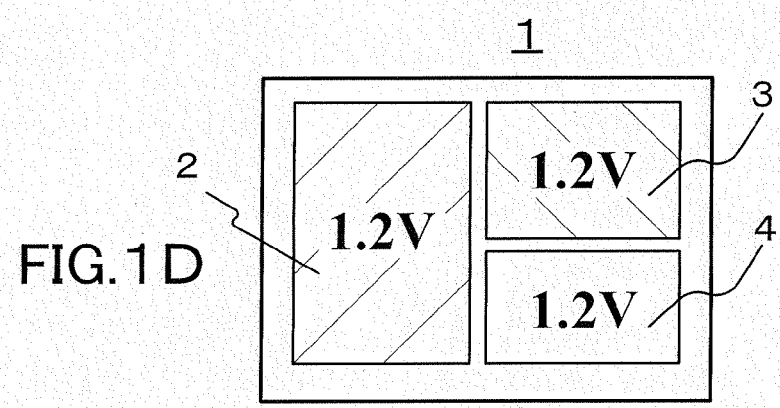

FIG. 1D shows a power applying state 7. In case of the power applying state 7, a voltage of 1.2 V is applied to all the power supply systems connected to the circuit group A2, the circuit group B3, and the circuit group C4. Further, in the power applying state 7, the data captured by the LSI 1 is read and the data is simultaneously processed. That is, the operation ratio of the circuit group A2 rises because the data is read from the circuit group A2 including the memory circuit such as an SRAM and the circuit group A2 requires the above-mentioned power voltage. Since the circuit group B3, including the CPU, processes the data, the operation ratio thereof rises and the circuit group B3 requires the power voltage. Further, since the circuit group C4 keeps the normal operation-state, the circuit group C4 requires the above-mentioned power voltage.

As described with reference to FIGS. 1A to 1D, the LSI 1 according to the first embodiment comprises a plurality of power supply systems and voltages of the power supply systems can be independently set.

Figure 2:
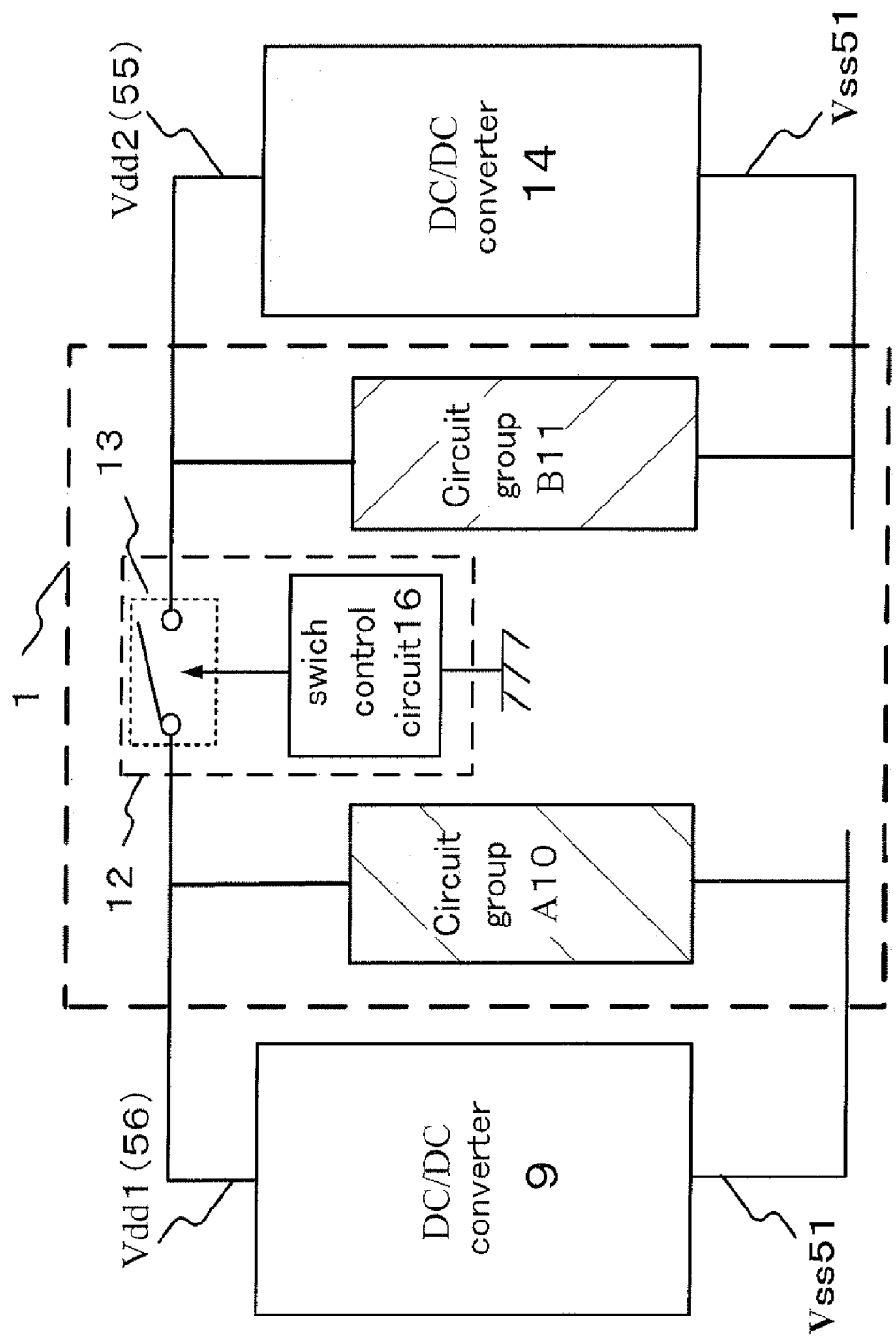
FIG. 2 is a diagram showing functional blocks in the LSI according to the first embodiment according to the first embodiment.

FIG. 2 is a diagram showing functional blocks of the LSI 1 according to the first embodiment. FIG. 2 shows the LSI 1 having the plurality of power supply systems, the circuit group A10 corresponding to the circuit group A2 shown in FIG. 1A, the circuit group B11 corresponding to the circuit group B3 shown in FIG. 1A, the DC/DC converters 9 and 14, and the connecting circuit 12 that connects the power of the circuit group A10 to the power of the circuit group B11. A control circuit that controls the DC/DC converters 9 and 14, which will be described later, is not shown.

The DC/DC converters 9 and 14 are power circuits that convert a DC voltage of a battery into a DC voltage for the LSI 1 and supply the DC voltages to the circuit groups A10 and B11. At the DC voltage for the LSI 1, if the power voltage drops in accordance with the power consumed by the power supply system in the LSI 1, the DC/DC converters 9 and 14 compensate for the amount of drop power voltage and control supply voltages so as to keep the DC voltage for the LSI 1. That is, the DC/DC converters 9 and 14 are the same as a well-known DC/DC converter in view of functions thereof. By the way, the well-known DC/DC converter is disclosed in, e.g., Catalog of a product MB39A123 by Fujitsu Limited, Catalog of a product MB3825A by Fujitsu Limited, and Japanese Unexamined Patent Application Publication No. 2002-88818.

Further, the DC/DC converter 9 is operated so that a voltage of the Vdd 1 (56) is kept with respect to the ground potential line Vss 51. Further, the DC/DC converter 14 is operated so that a voltage of the Vdd 2 (55) is kept with respect to the ground potential line Vss 51.

The LSI 1 having a plurality of power supply systems comprises: the circuit group A10 connected to one power supply system; the circuit group B11 connected to another power supply system; and the connecting circuit 12. Although not shown in FIG. 2, the LSI 1 comprises a circuit group including a clock generating circuit.

The circuit groups A10 and B11 are the same as the circuit groups A2 and B3 as described above with reference to FIG. 1A.

The connecting circuit 12 comprises: a switch circuit 13; and the switch control circuit 16 that controls the operation of the switch circuit 13. For example, as will be mentioned later, upon receiving a potential matching signal 18 indicating that a power voltage of the power supply system of the circuit group A10 and a power voltage of the power supply system of the circuit group B11 have the same potential, the connecting circuit 12 connects the power supply systems thereof with the switch circuit 13.

As will be mentioned later, the switch control circuit 16 is a circuit that outputs a signal so that high-potential lines of the power supply system are connected to the switch circuit 13.

The switch circuit 13 comprises a PMOS transistor. Further, upon inputting a signal having a logic "L" potential from the switch control circuit 16 that controls the operation of the switch circuit 13 to a gate terminal of the PMOS transistor, the switch circuit 13 connects a high-potential line of the power supply system connected to a source terminal of the PMOS transistor, e.g., the high-potential line Vdd 1 (56) of the power supply system connected to the circuit group A10 and the high-potential line Vdd 2 (55) of the power supply system connected to a drain terminal of the PMOS transistor, e.g., the power supply system connected to the circuit group B11. The switch circuit 13 comprises the PMOS transistor because the high-potential lines can be connected without the influence of a threshold of the PMOS transistor upon connecting the high-potential lines having high potentials.

Figure 3:
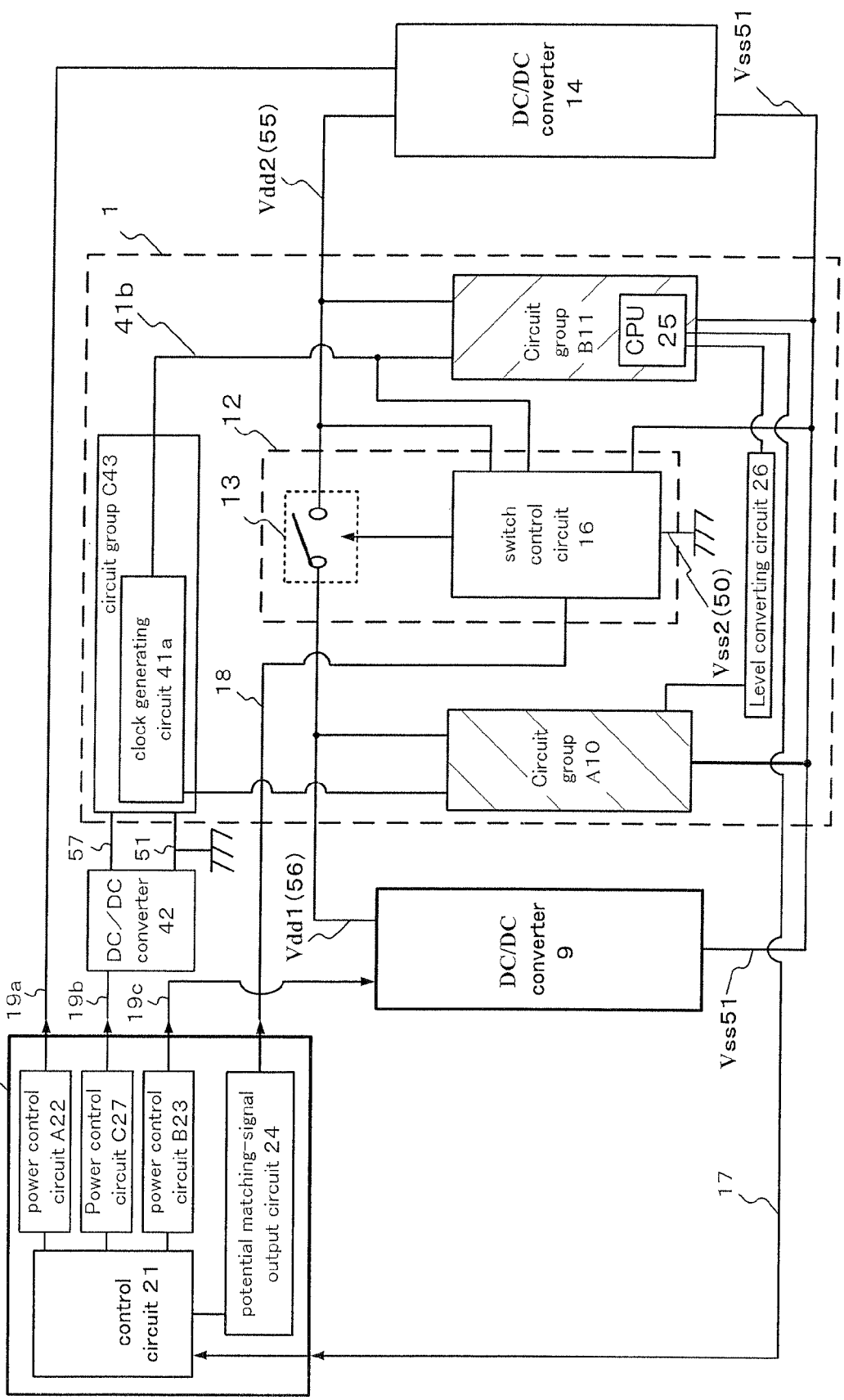
FIG. 3 is a diagram showing the details of the LSI shown in FIG. 2 and a control circuit.

FIG. 3 is a diagram showing the details of the LSI 1 shown in FIG. 2 and a control circuit 20. Further, FIG. 2 shows the LSI 1, the DC/DC converters 9 and 14, a DC/DC converter 42, and the control circuit 20. Further, the high-potential line Vdd 1 (51), the high-potential line Vdd 2 (55), a high-potential line Vdd 3 (57), the ground potential line Vss 51, and a ground potential line Vss 2 (50) are connected to the circuits. Further, the signal transmission of the circuits uses a control signal 17, the potential matching signal 18, and reference voltages 19a, 19b, and 19c. The LSI 1 comprises: the circuit group A10; the circuit group B11; a circuit group C43; the connecting circuit 12; and a level converting circuit 26.

Herein, the circuit groups A10, B51, and C43 are the same as the circuit groups A2, B3, and C4 shown in FIG. 1A. The DC/DC converter 42 is the same as the DC/DC converters 9 and 14.

The Vss 51 is a ground potential line commonly used by the DC/DC converters 9, 14, 42, and the LSI 1. The Vss 2 (50) is a ground potential line dedicated for the connecting circuit 12. The Vdd 1 (56) is a high-potential line for connecting the DC/DC converter 9 and the circuit group A10. The Vdd 2 (55) is a high-potential line for connecting the DC/DC converter 14 and the circuit group B11. The Vdd 3 (57) is a high-potential line for connecting the DC/DC converter 42 and the circuit group C43. The control signal 17 is transmitted to a signal line from a CPU 25 to the control circuit 20. The potential matching signal 18 is transmitted to a signal line from the control circuit 20 to the connecting circuit 12. The reference voltage 19a is transmitted from the control circuit 20 to the DC/DC converter 14. The reference voltage 19b is transmitted from the control circuit 20 to the DC/DC converter 42. The reference voltage 19c is transmitted from the control circuit 20 to the DC/DC converter 9.

The CPU 25 is a circuit for controlling the operation of the circuit group B11. Further, the CPU 25 is connected to the circuit group A10 via the level converting circuit 26, and controls the operation of the circuit group A10. Therefore, the CPU 25 grasps the operation ratios of the circuit group A10 and the circuit group B11. Further, the CPU 25 outputs the control signal 17 to the control circuit 20 so as to control the voltage on the basis of the operation ratio. In other words, the CPU 25 outputs a control signal for increasing the power voltage of the circuit group A10 upon externally inputting a command for obtaining external data to the LSI 1. Further, the CPU 25 outputs a control signal for increasing the power voltages of the circuit group A10 and the circuit group B11 to the LSI 1 upon externally inputting a command for processing the data. Furthermore, the CPU 25 turns-off the power of the circuit group A10 and outputs a control signal for decreasing the power voltage of the circuit group B11 when the command is not externally input to the LSI 1 and the situation is in the pause mode.

A clock generating circuit 41a is included in the circuit group C43, is used in the LSI 1, and generates a clock 41b.

Therefore, the clock 41b is supplied to the circuit groups A10, B11, and C43. The clock generating circuit 41a comprises a well-known PLL (Phase Lock Loop) circuit that is operated on the basis of a clock externally supplied from the LSI 1, or a clock divider circuit. The clock generating circuit 41a receives the power from the high-potential line Vdd 3 (57) from the DC/DC converter 42 and the power from the ground potential line the Vss 51.

The control circuit 20 comprises: a control circuit 21; a power control circuit A22; a power control circuit B23; a power control circuit C27; and a potential matching-signal output circuit 24. Further, the control circuit 20 outputs signals for controlling the DC/DC converters 9, 14, and 42. Furthermore, the control circuit 20 outputs the potential matching signal 18 to the connecting circuit 12.

The power control circuit A22 controls a supply voltage from the DC/DC converter 14. The DC/DC converter 14 converts a voltage from a battery as a power supply into a supply voltage on the basis of the reference voltage externally transmitted. Then, the power control circuit A22 outputs the reference voltage 19a to the DC/DC converter 14. In other words, the power control circuit A22 comprises: a plurality of resistors that are serially connected between a high-potential power supply and a low-potential power supply; a plurality of terminals connected between the resistors; and a selecting circuit that selects from which terminal the reference voltage is output. The selecting circuit is operated by a signal for selecting the reference voltage from the control circuit 21.

The power control circuit B23 outputs the reference voltage 19c, and controls the supply voltage from the DC/DC converter 9. The power control circuit B23 performs the similar operation of the power control circuit A22.

The power control circuit C27 outputs the reference voltage 19b and controls the supply voltage from the DC/DC converter 42. The power control circuit C27 performs the similar operation of the power control circuit A22.

The control circuit 21 controls the power control circuit A22, the power control circuit B23, or the power control circuit C27 in accordance with the operation situation of the circuit group A10, the circuit group B11, and the circuit group C43 in the LSI 1. In other words, the control circuit 21 receives the control signal 17 from the CPU 25 and outputs the signal for selecting the reference voltage to the power control circuit A22, the power control circuit B23, or the power control circuit C27. Therefore, the control circuit 21 can decode the signal for selecting the reference voltage 19a to the power control circuit A22 from a code signal comprising a plurality of bits from the CPU 25. In other words, the control circuit 21 controls the power control circuit A22, the power control circuit B23, or the power control circuit C27 so as to supply a high voltage of, e.g., 1.2 V to all the power supply systems from the DC/DC converters 9, 14, and 42, as shown in FIG. 1D, when all the circuits in the LSI 1 need to be operated at a high velocity. Further, the control circuit 21 controls the power control circuit A22 or the power control circuit B23 so as to supply the ground potential to the power supply system connected to the circuit group A10 and a low voltage of, e.g., 1.0 V, to the power supply system connected to the circuit group B11 from the DC/DC converters 9 and 14, as shown in FIG. 1C, when the circuit group B11 is operated at a low velocity and the circuit group A10 is not operated at all.

The potential-matching signal output circuit 24 outputs the potential matching signal 18 in the control operation for outputting the same potential to the DC/DC converters 9 and 14. In other words, the potential-matching signal output circuit 24 outputs the potential matching signal 18 when the signal for selecting the reference voltage 19a from the control circuit 21 to the power control circuit A22 is the same as the signal for selecting the reference voltage 19c to the power control circuit B23.

The connecting circuit 12 comprises: the switch circuit 13; and the switch control circuit 16 for controlling the operation of the switch circuit 13. Therefore, the connecting circuit 12 is identical to that described with reference to FIG. 2.

The level converting circuit 26 transmits a signal from the circuit operated by one high-potential power supply to the circuit operated by another high-potential power supply by converting the signal level. Upon converting the high-potential level having a low voltage into the high-potential level having a high voltage, the level converting circuit 26 can comprise a level shifting circuit having buffer circuits driven by a high voltage. On the other hand, upon converting the high-potential level having a high voltage into the high-potential level having a low voltage, the level converting circuit 26 can comprise a well-known inverter circuit driven by a low voltage.

Figure 4:
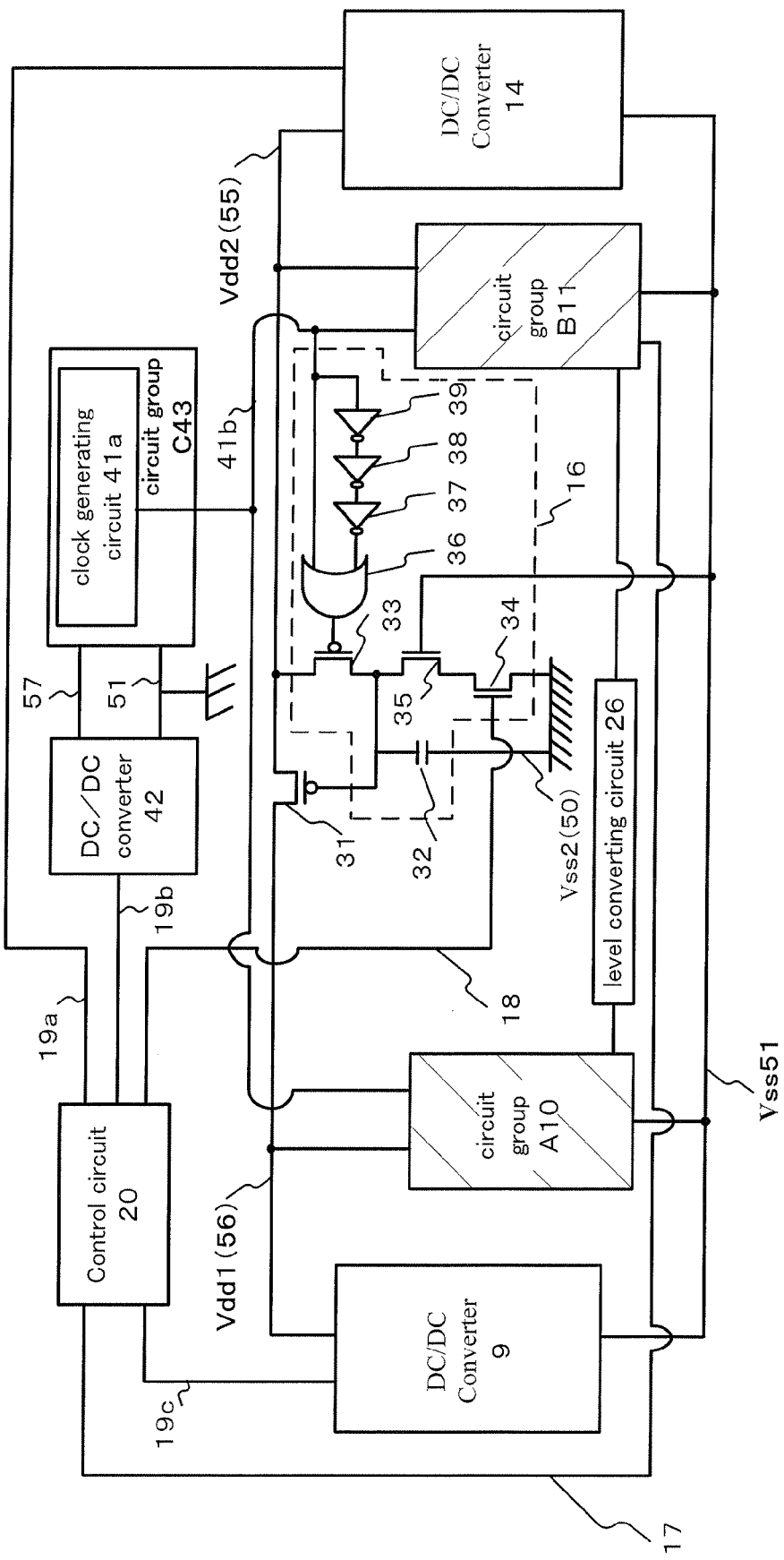
FIG. 4 is a diagram showing specific circuits of the control circuit and DC/DC converters shown in FIG. 3 and the LSI shown in FIG. 3.

FIG. 4 is a diagram showing the control circuit 20, and the DC/DC converters 9, 14, and 42 shown in FIG. 3 and an example of specific circuits in the LSI 1 shown in FIG. 3.

Herein, the DC/DC converters 9, 14, and 42, the control circuit 20, and the LSI 1 are identical those described with reference to FIG. 2. Further, the circuit groups A10, B11, and C43, and the level converting circuit 26 are identical to those described with reference to FIG. 3.

However, the connecting circuit 12 comprises: a PMOS transistor 31; a capacitor 32; NMOS transistors 33, 34, and 35; a 2-input OR circuit 36; and inverter circuits 37, 38, and 39.

The PMOS transistor 31 corresponds to the switch circuit 13 described above with reference to FIGS. 2 and 3, and connects the high-potential lines in the different power supply systems. The high-potential lines are connected by the PMOS transistor because the high-potential lines are connected without the influence of a threshold of the PMOS transistor. A portion other than the PMOS transistor 31 in the connecting circuit 12 forms the switch control circuit 16 that controls the on/off operation of the PMOS transistor 31.

A gate terminal of the PMOS transistor 31 is connected to the circuit for controlling the on/off operation of the PMOS transistor 31. Specifically, the gate terminal is connected to one electrode of the capacitor 32, a drain of the NMOS transistor 35, and a drain of the NMOS transistor 33. A source terminal of the PMOS transistor 31 is connected to the power supply system Vdd 1 (56) connected to the circuit group A10. A drain terminal of the PMOS transistor 31 is connected to the high-potential line Vdd 2 (55) in the power supply system connected to the circuit group B11.

The other electrode of the capacitor 32 is connected to the ground potential line Vss 2 (50) dedicated for the connecting circuit 12.

A source of the NMOS transistor 33 is connected to the high-potential line Vdd 2 (55) of the power supply system connected to the circuit group B11. A gate of the NMOS transistor 33 is connected to an output terminal of the 2-input OR circuit 36.

A drain of the NMOS transistor 34 is connected to a drain of the NMOS transistor 35. A gate of the NMOS transistor 34 is connected to the ground potential line Vss 51 in the power supply system of the circuit group B11.

A source of the NMOS transistor 34 is connected to the ground potential line Vss 2 (50) dedicated for the connecting circuit 12. A gate of the NMOS transistor 34 is connected to a signal line for transmitting the potential matching signal 18 output from the control circuit 20. The potential matching signal 18 indicates an "H" logical signal in the control operation for matching the potential of the high-potential line Vdd 1 (56) with the potential of the high-potential line Vdd 2 (55). On the other hand, the potential matching signal 18 indicates an "L" logical signal in the control operation for setting the potential of the high-potential line Vdd 1 (56) to be different from the potential of the high-potential line Vdd 2 (55).

An output terminal of the inverter circuit 37 is connected to one input terminal of the 2-input OR circuit 36. A clock signal line for transmitting the clock 41b from the clock generating circuit 41a is connected to the other input terminal of the 2-input OR circuit 36.

An output terminal of the inverter circuit 38 is connected to an input terminal of the inverter circuit 37. An output terminal of the inverter circuit 39 is connected to an output terminal of the inverter circuit 38. A clock signal line for transmitting the clock 41b from the clock generating circuit 41a is connected to an input terminal of the inverter circuit 39.

Figure 6:
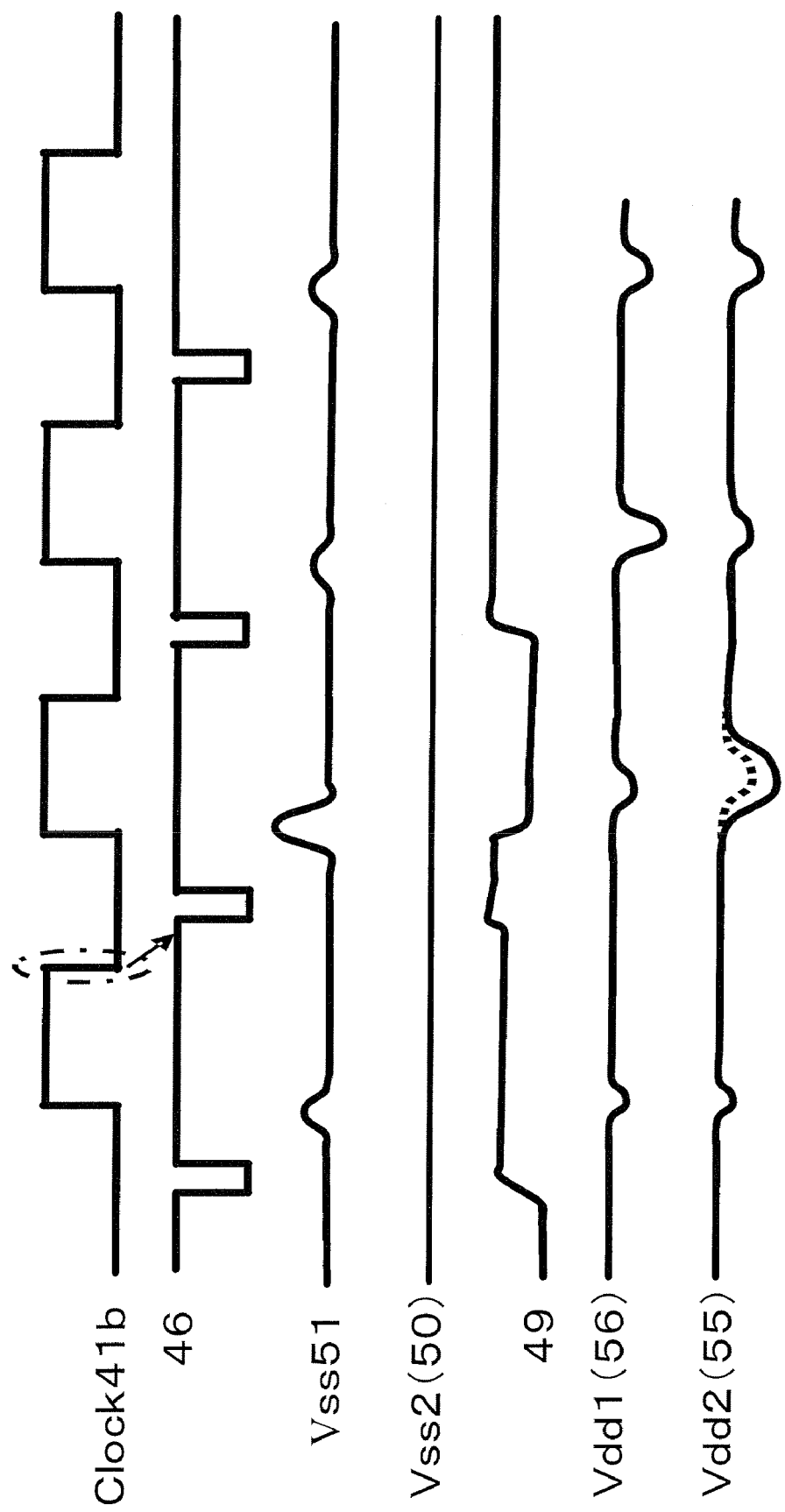
FIG. 6 is a diagram showing operation waveforms of a connecting circuit according to the first embodiment.

The following will describe the operation of the connecting circuit 12 with reference to FIG. 6. FIG. 6 is a diagram showing operation waveforms of the connecting circuit 12 according to the first embodiment. FIG. 6 shows a waveform 45 indicating the change in potential of the clock 41b from the clock generating circuit 41a, a waveform 46 indicating the change in potential of the output signal of the 2-input OR circuit 36, a waveform indicating the change in potential of the ground potential line Vss 51, a waveform indicating the change in potential of the ground potential line Vss 2 (50), a waveform 49 indicating the change in potential of a gate terminal of the PMOS transistor 31, a waveform indicating the change in potential of the high-potential line Vdd 1 (56), and a waveform indicating the change in potential of the high-potential line Vdd 2 (55). Herein, the following will describe the operation of the connecting circuit 12 and the waveforms.

The waveform 45 indicating the clock 41b is a clock waveform periodically repeating "H" and "L".

The waveform 46 is a pulse waveform having the "L" logic for a predetermined period synchronously with a rising edge of the clock 41b. The waveform 46 indicates the pulse waveform because of the following reason. First, the clock 41b is input to one input terminal of the 2-input OR circuit 36, and is also input to an input terminal of the inverter circuit 39. Then, at the rising edge of the clock 41b, i.e., at the changing timing form the "H" logic to the "L" logic, the change from the "H" logic to the "L" logic is immediately transmitted to the one input terminal of the 2-input OR circuit 36. The change from the "L" logic to the "H" logic is transmitted to the other input of the 2-input OR circuit 36 via the inverter circuits 37, 38, and 39, with the delay from the falling edge of the clock 41b. As a consequence, there is a period for inputting the "L" logic to the one input terminal and the other input terminal of the 2-input OR circuit 36. For the above period, the 2-input OR circuit 36 outputs a signal having the "L" logic. Then, since the "L" logic is not simultaneously input to the one input terminal and the other input terminal of the 2-input OR circuit 36 for a period except for the above period, the pulse waveform indicated by the waveform 46 is caused. In accordance with above description, the 2-input OR circuit 36 and the inverter circuits 37, 38, and 39 form a pulse generating circuit.

The waveform indicating the ground potential line Vss 51 has potentials rising for a predetermined period synchronously with the rising edge of the clock 41b. If the circuit group B11 is operated synchronously with the rising edge of the clock 41b, the consumption current temporarily increases for the period of the rising edge of the clock 41b, and the potential of the ground potential line Vss 51 thus increases.

The waveform indicating the ground potential line Vss 2 (50) shows a stable ground potential. Because the ground potential line Vss 51 of the circuit groups B11 and A10 is different from the ground potential line Vss 2 (50) of the connecting circuit 12, and the waveform of the ground potential line Vss 2 (50) is not influenced from the operation of the circuit groups B11 and A10.

The waveform 49 has the dropping potentials that change to increase every input of pulses indicated by the waveform 46 to the gate of the NMOS transistor 33. Since the gate terminal of the PMOS transistor 31 is connected to the drain of the NMOS transistor 33, the potential of the gate terminal of the PMOS transistor 31 becomes that of the high-potential line Vdd 2 (55) every on-operation of the NMOS transistor 33. On the other hand, the potential of the gate terminal of the PMOS transistor 31 drops because of the following reason. First of all, the potential matching signal 18 having the "H" logic is output to the gate of the NMOS transistor 34, and the NMOS transistor 34 is turned on. Further, if there is the difference in potential between the ground potential line Vss 51 and the ground potential line Vss 2 (50), the NMOS transistor 35 is turned on. Then, the ground potential line Vss 2 (50) is electrically connected to the gate terminal of the PMOS transistor 31, and charges stored in the capacitor 32 flow to the ground potential line Vss 2 (50). In accordance with above description, the drop degree of the potentials of the gate terminal in the PMOS transistor 31 corresponds to the rising degree of the potential of the ground potential line Vss 51. Because the on-resistance of the NMOS transistor 35 decreases in accordance with the rising degree of the potential of the ground potential line Vss 51. Therefore, the NMOS transistors 33, 34, and 35 and the capacitor 32 form a monitoring circuit that is active in response to the potential matching signal 18 of the "H" logic and monitors the rise in potentials of the ground potential line Vss 51. Further, the monitoring circuit outputs a pulse signal having the "L" logic to the gate terminal of the PMOS transistor 31, when the rise in potentials of the ground potential line Vss 51 is over a threshold of the NMOS transistor 35.

Accordingly, the PMOS transistor 31 is turned on and the high-potential line Vdd 1 (56) of the power supply system connected to the circuit group A10 is connected to the high-potential line Vdd 2 (55) of the power supply system connected to the circuit group B11.

Since the circuit group A10 is operated synchronously with the rise of the clock 41b, at the waveform indicating the change in potential of the high-potential line Vdd 1 (56), the potential drops synchronously with the clock 41b.

Since the circuit group B11 is operated synchronously with the rise of the clock 41b, at the waveform indicating the change in potential of the high-potential line Vdd 2 (55), the potential drops synchronously with the clock 41b. By the way, in the waveforms indicating the change in potential of the high-potential line Vdd 2 (55), a waveform shown by a solid line indicates the drop of the potential when the connecting operation of the high-potential line of the power supply system of the connecting circuit 12 is not performed. On the other hand, a waveform shown by a dotted line indicates the drop of the potential when the connecting operation of the high-potential line of the power supply system of the connecting circuit 12 is performed. In other words, the waveform shown by the dotted line indicates the reduction in degree of the drop of the potential when the connecting operation of the high-potential line of the power supply system of the connecting circuit 12 is performed. Charges are applied to the high-potential line Vdd 2 (55) of the power supply system connected to the circuit group B11 from the parasitic capacitance of the power supply system connected to the circuit group A10, thereby suppressing the drop of the potential of the high-potential line Vdd 2 (55) of the circuit group B11.

In accordance with above description, the connecting circuit 12 comprises: a pulse circuit that generates a first pulse signal in response to the clock 41b; a monitoring circuit that is active in response to the potential matching signal 18 having the "H" logic at the gate of the NMOS transistor 35, monitors the rise in potential of the ground potential line Vss 51 in the circuit group B11, and generates a second pulse signal of the "L" logic in accordance with the rise in potential of the ground potential line Vss 51; and the PMOS transistor 31 that connects the high-potential lines of different power supply systems in response to the second pulse signal. Further, when the rise in potential of the ground potential line Vss 51 reaches a predetermined value, the connecting circuit 12 connects the high-potential line Vdd 2 (55) to the high-potential line Vdd 1 (56). In other words, upon receiving the potential matching signal 18, the connecting circuit 12 does not always connect the high-potential line Vdd 2 (55) to the high-potential line Vdd 1 (56) but intermittently connects the high-potential line Vdd 2 (55) to the high-potential line Vdd 1 (56).

As mentioned above, current flows between the high-potential line Vdd 2 (55) and the high-potential line Vdd 1 (56), and the potentials of the high-potential line Vdd 2 (55) and the high-potential line Vdd 1 (56) are stable. The high-potential lines are intermittently connected, thereby preventing the inflow between the DC/DC converters 9 and 14.

Figure 5:
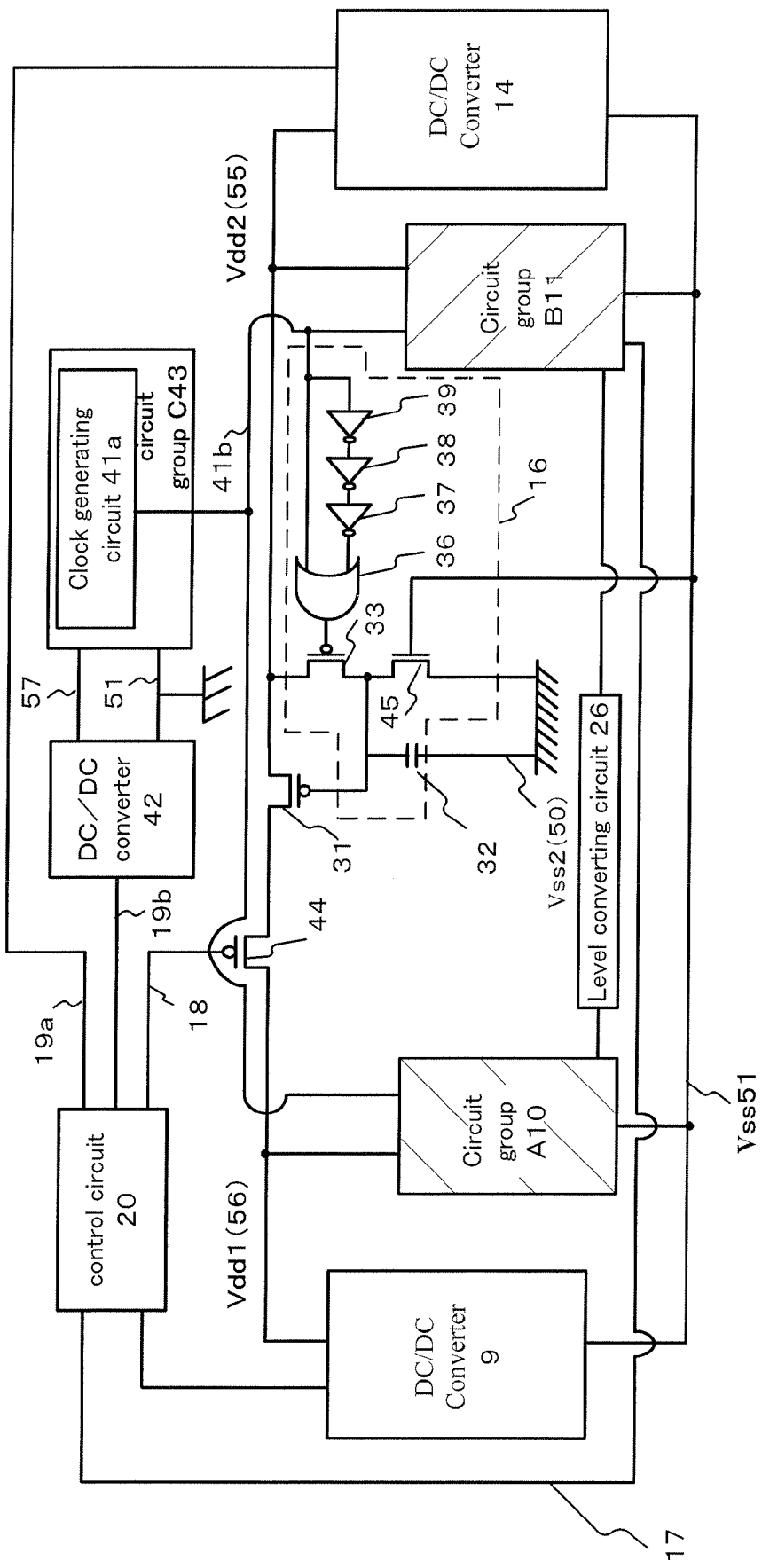
FIG. 5 is a diagram showing the control circuit and the DC/DC converters according to the first embodiment and an LSI according to a modification of the LSI shown in FIG. 3.

FIG. 5 is a diagram showing the control circuit 20, and the DC/DC converters 9, 14, and 42 according to the first embodiment and an LSI 1 according to a modification of the LSI 1 shown in FIG. 3.

The following will describe a connecting circuit 12 according to the modification with reference to FIG. 5.

Herein, the DC/DC converters 9, 14, and 42, the control circuit 20, and the LSI 1 are similar to those described with reference to FIG. 2. Further, the circuit groups A10, B11, and C43 and the level converting circuit 26 are similar to those described with reference to FIG. 3.

However, the connecting circuit 12 according to the modification comprises: the PMOS transistor 31; a PMOS transistor 44; the capacitor 32; NMOS transistors 33 and 45; the 2-input OR circuit 36; and the inverter circuits 37, 38, and 39.

The PMOS transistor 31 and the PMOS transistor 44 correspond to the switch circuit 13 described with reference to FIGS. 2 and 3, and connect the high-potential lines of different power supply systems. A portion except for the PMOS transistors 31 and 44 in the connecting circuit 12 forms the switch control circuit 16 that controls the on/off operation of the PMOS transistor 31.

With the connecting circuit 12 according to the modification, the gate terminal of the PMOS transistor 31 is connected to the switch control circuit 16 that controls the on/off operation of the PMOS transistor 31, similarly to the connecting circuit 12 according to the first embodiment. Specifically, the gate terminal of the PMOS transistor 31 is connected to a drain of one electrode of the capacitor 32, a drain of the NMOS transistor 45, and a drain of the NMOS transistor 33. Further, the drain terminal of the PMOS transistor 31 is connected to the high-potential line Vdd 2 (55) of the power supply system connected to the circuit group B11.

However, with the connecting circuit 12 according to the modification, the source terminal of the PMOS transistor 31 is connected to a drain terminal of the PMOS transistor 44.

With the connecting circuit 12 according to the modification, a gate terminal of the PMOS transistor 44 is connected from the control circuit 20 to a signal line for transmitting the potential matching signal 18 output from the control circuit 20. In the control operation for matching the potential of the high-potential line Vdd 1 (56) to the potential of the high-potential line Vdd 2 (55), the potential matching signal 18 has the "L" logic. On the other hand, the potential matching signal 18 has the "H" logic in the control operation for setting the potential of the high-potential line Vdd 1 (56) to be different from the potential of the high-potential line Vdd 2 (55).

Further, a source terminal of the PMOS transistor 44 is connected to the high-potential line Vdd 1 (56) of the power supply system connected to the circuit group A10.

The other electrode of the capacitor 32 is connected to the ground potential line Vss 2 (50) dedicated for the connecting circuit 12 according to the modification.

The source of the NMOS transistor 33 is connected to the high-potential line Vdd 2 (55) of the power supply system connected to the circuit group B11. The gate of the NMOS transistor 33 is connected to the output terminal of the 2-input OR circuit 36.

A source of the NMOS transistor 45 is connected to the ground potential line Vss 2 (50) of the connecting circuit 12 according to the modification. A gate of the NMOS transistor 45 is connected to the ground potential line Vss 51 of the power supply system connected to the circuit group B11.

An output terminal of the inverter circuit 37 is connected to an input terminal of the 2-input OR circuit. A clock signal line for transmitting the clock 41b from the clock generating circuit 41a is connected to the other input terminal of the 2-input OR circuit 36.

An output terminal of the inverter circuit 38 is connected to an input terminal of the inverter circuit 37. An output terminal of the inverter circuit 39 is connected to an input terminal of the inverter circuit 38. A clock signal line for transmitting the clock 41b from the clock generating circuit 41a is connected to an input terminal of the inverter circuit 39.

The following will describe the operation of the connecting circuit 12 according to the modification with reference to FIG. 6. FIG. 4 shows the waveform 45 indicating the change in potential of the clock 41b from the clock generating circuit 41a, the waveform 46 indicating the change in potential of the 2-input OR circuit 36, the waveform indicating the change in potential of the ground potential line Vss 51, the waveform indicating the change in potential of the ground potential line Vss 2 (50), the waveform 49 indicating the change in potential of the gate terminal of the PMOS transistor 31, the waveform indicating the change in potential of the high-potential line Vdd 1 (56), and the waveform indicating the change in potential of the high-potential line Vdd 2 (55). The following will describe the waveforms with the operation of the connecting circuit 12 according to the modification.

With the connecting circuit 12 according to the modification, the waveform 45 indicates a clock waveform periodically repeating the "H" logic and the "L" logic.

With the connecting circuit 12 according to the modification, the waveform 46 is a pulse waveform at the "L" logic for a predetermined period synchronously with a falling edge of the clock 41b. The waveform 46 is a pulse waveform because of the same reason described for the operation of the connecting circuit 12 according to the first embodiment. Further, the 2-input OR circuit 36 and the inverter circuits 37, 38, and 39 form a pulse generating circuit, similarly to the connecting circuit 12 according to the first embodiment.

At the waveform indicating the potential of the high-potential line Vss 51, the potential rises for a predetermined period synchronously with the timing of a rising edge of the clock 41b. Since the circuit group B11 is operated synchronously with the rising edge of the clock 41b, the consumption current temporarily increases at the timing of the rising edge of the clock 41b. Then, since the consumption current temporarily flow to the ground potential line Vss 51, the potential of the ground potential line Vss 51 increases.

The waveform indicating the ground potential line Vss 2 (50) of the connecting circuit 12 indicates a stable ground potential. The ground potential line Vss 51 of the circuit groups B11 and A10 are different from the ground potential line Vss 2 (50) of the connecting circuit 12, and are not influenced from the operation of the circuit groups B11 and A10.

At the waveform 49, the potential dropping every input of the pulse represented by the waveform 46 to the gate of the NMOS transistor 33 increases. The potential of the waveform 49 rises or drops because the NMOS transistors 33 and 45 and the capacitor 32 perform the similar operation of the connecting circuit 12 according to the first embodiment. On the other hand, the connecting circuit 12 according to the modification does not have the MOS transistor corresponding to the NMOS transistor 34 of the connecting circuit 12 according to the first embodiment. Therefore, the drain of the NMOS transistor 33 is always connected to the ground potential line Vss 50 via the NMOS transistor 45. Thus, the NMOS transistors 33 and 45 and the capacitor 32 form a monitoring circuit that is always active and monitors the rise of the potential of the ground potential line Vss 51. The monitoring circuit outputs a pulse signal of the "L" logic to the gate terminal of the PMOS transistor 31, when the potential of the ground potential line Vss 51 is increased to be over a threshold of the NMOS transistor 45.

Accordingly, the PMOS transistor 31 is turned on and the drain of the PMOS transistor 31 is connected to the power supply system connected to the circuit group B11. In this case, upon outputting the potential matching signal 18 having the "L" logic to the gate terminal of the PMOS transistor 44 from the control circuit 20, the PMOS transistor 44 is turned on and the power supply system connected to the circuit group B11 is thus connected to the power supply system connected to the circuit group A10.

At the waveform indicating the change in potential of the high-potential line Vdd 1 (56), the potential drops synchronously with the clock 41b. Since the circuit group A10 is operated synchronously with the rising edge of the clock 41b, the consumption current temporarily increases for a period of the rising edge of the clock 41b. Therefore, the voltage drops at the high-potential line Vdd 1 (56).

At the waveform indicating the change in potential of the high-potential line Vdd 2 (55), the potential drops synchronously with the clock 41b. The circuit group B11 is operated synchronously with the rising edge of the clock 41b and the consumption current temporarily increases for a period of the rising edge of the clock 41b. Thus, the potential drops at the high-potential line Vdd 2 (55). On the other hand, in the waveform indicating the potential of the high-potential line Vdd 1 (56), a waveform shown by a solid line represents the drop of the potential when the connecting operation of the power supply system of the connecting circuit 12 according to the modification is not executed. On the other hand, a waveform shown by a dotted line represents the drop of the potential upon performing the connecting operation of the high-potential line of the power supply system of the connecting circuit 12 according to the modification. In other words, upon performing the power supply system in the connecting circuit 12 according to the modification, the degree of drop of the potential decreases. Charges are applied to the high-potential line Vdd 2 (55) of the power supply system connected to the circuit group B11 from the parasitic capacitance of the high-potential line Vdd 1 (56) of the power supply system connected to the circuit group A10, thereby suppressing the drop of the potential of the high-potential line Vdd 2 (55) of the circuit group B11.

Obviously, the connecting circuit 12 according to the modification comprises: the pulse circuit that generates the first pulse signal in response to the clock 41*b*; the monitoring circuit that monitors the rise of the potential of the ground potential line Vss 51 of the circuit group B11 and generates the second pulse signal having the "L" logic in accordance with the rise of the potential of the ground potential line Vss 51; the PMOS transistor 44 that is turned on in response to the potential matching signal 18 having the "L" logic at the gate thereof; and the PMOS transistor 31 that connects the high-potential lines of different power supply systems in response to the second pulse signal. Further, the connecting circuit 12 according to the modification connects the high-potential line Vdd 2 (55) to the high-potential line Vdd 1 (56) when the potential of the ground potential line Vss 51 of the power supply system connected to the circuit group B11 is increased to be a constant value.

As mentioned above, current flows between the high-potential line Vdd 2 (55) and the high-potential line Vdd 1 (56), and the potentials of the high-potential line Vdd 2 (55) and the high-potential line Vdd 1 (56) are stable. The high-potential lines are intermittently connected, thereby the in-flow of the current between the DC/DC converters 9 and 14.

Figure 7:
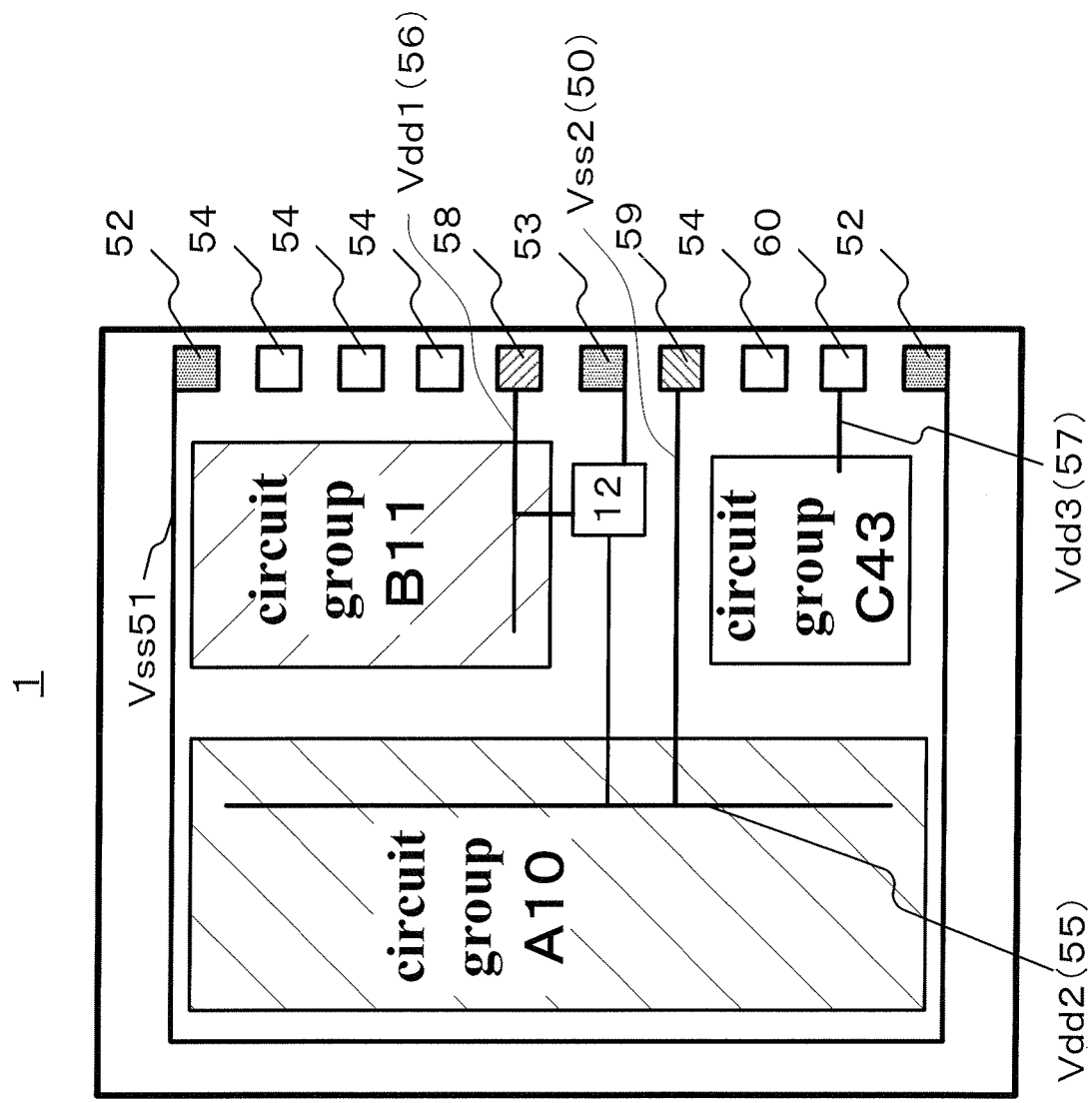
FIG. 7 is a diagram showing the LSI having a dedicated terminal and a ground potential line Vss connected to the dedicated terminal.
Figure 8:
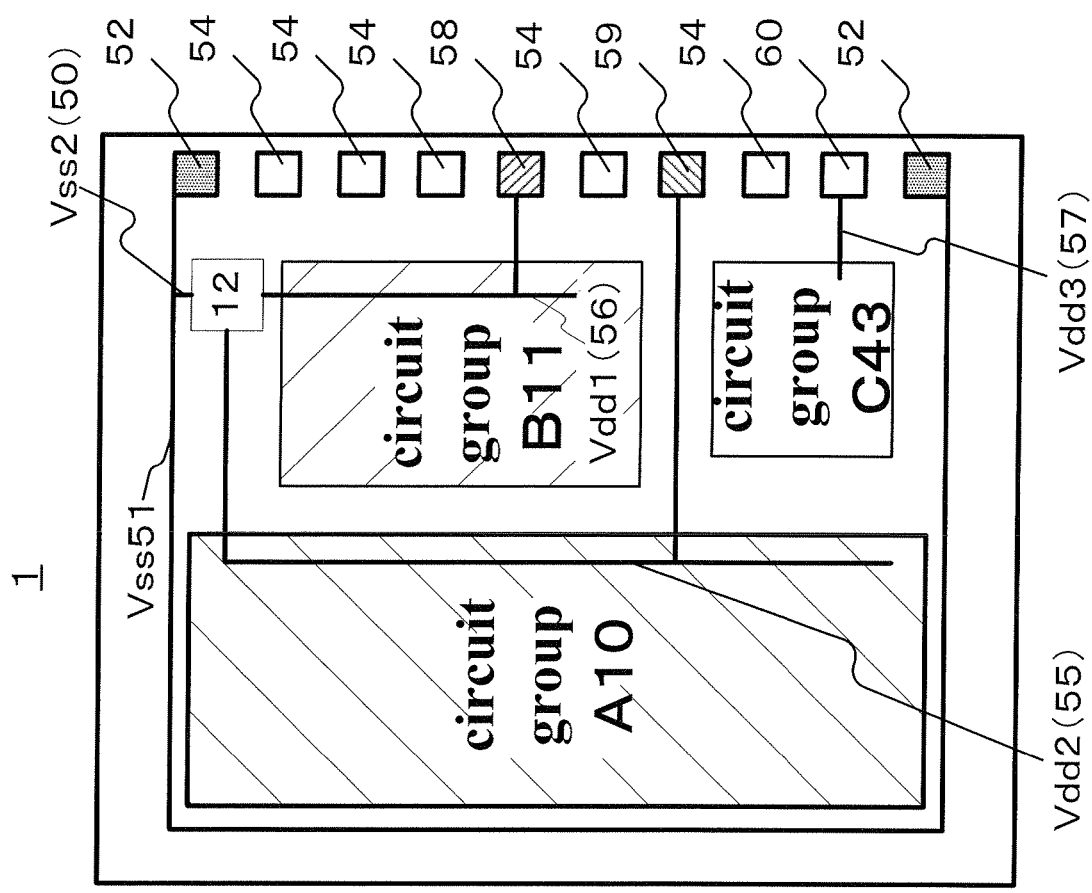
FIG. 8 is a diagram showing the LSI having the ground potential line Vss connected near a Vss terminal.

Specifically, the following will describe the ground potential line Vss 2 (50) dedicated for the connecting circuit 12 or the modification of the connecting circuit 12 with reference to FIGS. 7 and 8.

FIG. 7 is a diagram showing the LSI 1 having a dedicated terminal and the ground potential line Vss 2 (50) connected to the dedicated terminal.

The LSI 1 comprises: the circuit group A10; the circuit group B11; the circuit group C43; the connecting circuit 12; the ground potential line Vss 2 (50); the ground potential line The Vss 51; a Vss terminal 52; a Vss dedicated terminal 53; other terminals 54; the high-potential line Vdd 2 (55); the high-potential line Vdd 1 (56); the high-potential line Vdd 3 (57); a Vdd 1 terminal 58; a Vdd 2 terminal 59; and a Vdd 3 terminal 60.

The Vss terminal 52 applies an external ground potential to the LSI 1. Further, the Vss terminal 52 is connected to the ground potential line Vss 51.

The Vss dedicated terminal 53 applies an external ground potential to the LSI 1. Further, the Vss dedicated terminal 53 is connected to the ground potential line Vss 2 (50).

The other terminals 54 include a terminal for externally receiving the signal to the LSI 1, a terminal for applying the potential, and a signal for outputting the signal. The external signals include, e.g., a command signal and an input data signal. Further, the terminal for applying the potential applies, e.g., a reference voltage. Furthermore, the terminal for outputting the signal outputs, e.g., output data.

The Vdd 1 terminal 58 externally applies a high potential to the circuit group B11. Further, the high-potential line Vdd 1 (56) is connected to Vdd 1 terminal 58.

The Vdd 2 terminal 59 externally applies a high potential to the circuit group A10. Furthermore, the high-potential line Vdd 2 (55) is connected to the Vdd 2 terminal 59.

The Vdd 3 terminal 60 externally applies a high potential to the circuit group C43. Further, the high-potential line Vdd 3 (57) is connected to the Vdd 3 terminal 60.

The Vss terminal 52, the Vss dedicated terminal 53, and the other terminal 54 are arranged along the right side at plane level.

The circuit groups A10, B11, and C43, and the connecting circuit 12 are similar to those described with reference to FIG. 3. Further, the circuit group A10 shares the left half of the LSI 1 at plane level. The circuit group B11 shares ¼ of the upper right portion of the LSI 1 at plane level. The circuit group C43 shares ¼ of the lower right of the LSI 1 at plane level. A portion sensing a voltage of the ground potential line Vss 2 (50) of the connecting circuit 12 is almost in the center of the LSI 1.

The ground potential line Vss 2 (50), the ground potential line The Vss 51, the high-potential line Vdd 2 (55), and the high-potential line Vdd 1 (56) are similar to the those described with reference to FIG. 2.

Further, the ground potential line Vss 51 applies the ground potential to the circuit groups A10, B11, and C43.

The high-potential line Vdd 1 (56) is a high-potential line that applies a high potential to the circuit group B11. Further, the high-potential line Vdd 1 (56) is connected to the connecting circuit 12. The high-potential line Vdd 2 (55) is a high-potential line that applies a high potential to the circuit group A10. Further, the high-potential line Vdd 2 (55) is connected to the connecting circuit 12. The high-potential line Vdd 3 (57) is a high-potential line that applies a high potential to the circuit group C43.

The ground potential line Vss 2 (50) is a ground potential line dedicated for connection to the connecting circuit 12.

As mentioned above, in the LSI 11 shown in FIG. 7, the Vss dedicated terminal 53 connected to the ground potential line Vss 2 (50) dedicated to the connecting circuit 12 or the modification of the connecting circuit 12 is arranged, independently of the Vss terminal 52 connected to the ground potential line Vss 51 of the circuit group A10 or B11. Therefore, the potential of the dedicated ground potential line Vss 2 (50) is stable. Then, the monitoring circuit of the connecting circuit 12 or the modification of the connecting circuit 12 monitors the ground potential of the power supply system connected to the circuit group A10 or B11 by comparing the potential of the ground potential line Vss 51 of the circuit group A10 or B11 with the potential of the dedicated ground potential line Vss 2 (50) arranged independently of the ground potential line Vss 51.

FIG. 8 is a diagram showing the LSI 1 having the ground potential line Vss 2 (50) connected near the Vss terminal 52.

The LSI 1 is similar to the LSI 1 shown in FIG. 7. However, the LSI 1 shown in FIG. 8 does not comprise the Vss dedicated terminal 53. Differently from the LSI 1 shown in FIG. 7, the ground potential line Vss 2 (50) in the LSI 1 is connected to the Vss terminal 52.

Differently, the connecting circuit 12 in the LSI 1 is planarity arranged to the Vss terminal 52 in the corner on the upper right.

As mentioned above, in the LSI 1 shown in FIG. 8, the ground potential line Vss 2 (50) dedicated to the connecting circuit 12 or the modification of the connecting circuit 12 is connected to the ground potential line Vss 51 near the Vss terminal 52. Therefore, the potential of the dedicated ground potential line Vss 2 (50) is stable. Resistance comprising resistance of the dedicated ground potential line Vss 2 (50) and resistance of the ground potential line Vss 51, from the connecting circuit 12 to the Vss terminal 52, is low, and the dedicated ground potential line Vss 2 (50) is not influenced from the change in potential of the ground potential line Vss 51 due to the operation of the circuit groups A10 and B11.

Then, the monitoring circuit of the connecting circuit 12 or the modification of the connecting circuit 12 monitors the ground potential of the power supply system connected to the circuit group A10 or B11 by comparing the potential of the ground potential line Vss 51 of the circuit group A10 or B11 with the potential of the dedicated ground potential line Vss 2 (50) separately arranged near the Vss terminal 52.

The following will describe advantages of the connecting circuit 12 with reference to FIGS. 9A and 9B. Further, FIGS. 9A and 9B are diagrams showing noises of the high-potential lines and the low-potential lines of the power supply systems connected to the circuit groups A10 and B11.

FIG. 9A is a diagram showing the power supply systems connected to the circuit groups A10 and B11. Further, FIG. 9A shows the circuit group A10, the high-potential line Vdd 1 (56), the ground potential line Vss 51, the circuit group B11, and the high-potential line Vdd 2 (55).

The circuit group A10 comprises circuits in the LSI 1. Further, the circuit group A10 does not comprise a circuit in which the operation ratio thereof rapidly changes or increases. The high-potential line Vdd 1 (56) is a high-potential line of the power supply system connected to the circuit group A10. The ground potential line Vss 51 is a ground potential line of the power supply system connected to circuit group A50. The operation ratios of the circuit group A50 do not rapidly increase and a large power noise is not caused at the high-potential line Vdd 1 (56) or the ground potential line Vss 51 because of the following reason. First, charges stored in the parasitic capacitance connected to the power supply system are so high to supply current consumed by the circuit group A10. Then, since the operation ratio of the circuit group A10 increases, the current consumed by the circuit group A10 can be supplied upon changing the voltage of the high-potential line Vdd 1 (56) to the high potential.

The circuit group B11 comprises circuits in the LSI 1. Further, the circuit group B11 comprises a circuit, e.g., a CPU, in which the operation ratio thereof rapidly rises. The high-potential line Vdd 2 (55) is a high-potential line of the power supply system connected to the circuit group B11. The ground potential line Vss 51 is a ground potential line of the power supply system connected to the circuit group B11. Since the operation ratio of the circuit group B11 rapidly increases, a high power noise is generated at the high-potential line Vdd 2 (55) or the ground potential line Vss 51 because of the following reason. First, charges stored in the parasitic capacitance connected to the power supply system are not so high to supply current consumed by the circuit group B11. Then, since the operation ratio of the circuit group B11 increases, the current consumed by the circuit group B11 is not supplied form the parasitic capacitance upon changing the voltage of the high-potential line Vdd 2 (55) to a high potential. Therefore, the potential of the high-potential line Vdd 2 (55) is reduced due to the drop in voltage. Thus, the power noise is caused by rapidly reducing the voltage.

Since the high-potential lines of the power supply system shown in FIG. 9A are not connected, the power noise of the power supply system connected to the circuit group B11 is not transmitted to another power supply system. However, the power noise of the power supply system connected to the circuit group B11 is continuously kept.

FIG. 9B is a diagram showing the case of connecting the power supply system connected to the circuit group A10 to the power supply system connected to the circuit group B11.

However, referring to FIG. 9B, the connecting circuit 12 connects the high-potential line Vdd 1 (56) of the power supply system connected to the circuit group A10 to the high-potential line Vdd 2 (55) of the power supply system connected to the circuit group B11. Further, FIG. 9B shows the state of the power noise in this case.

As described above with reference to FIGS. 4 and 5, the connecting circuit 12 receives the potential matching signal 18 from the control circuit 20 and intermittently connects the high-potential line of the power supply system having the same potential in accordance with the increase degree of the potential of the ground potential line Vss 51.

As a consequence, the power noise of the power supply system connected to the circuit group A10 is transmitted to the power supply system connected to the circuit group B11. However, the power noise generated in the power supply system connected to the circuit group B11 is reduced by current supplied from the parasitic capacitance connected to the power supply system connected to the circuit group A10. Even if increasing the operation ratio of the circuit group B11 irrespective of the change in potential of the high-potential line Vdd 2 (55), the power noise is caused. However, since the current is similarly supplied from high-potential line Vdd 1 (56), the power noise is reduced. As mentioned above, the current flows between the high-potential line Vdd 2 (55) and the high-potential line Vdd 1 (56), and the potentials of the high-potential line Vdd 2 (55) and the high-potential line Vdd 1 (56) are stable.

The high-potential lines are intermittently connected as mentioned above, thereby preventing the interference between the DC/DC converters 9 and 14.

The interference is as follows. First, the DC/DC converters 9 and 14 are operated so as to stabilize the potentials thereof. Then, in the operation that one of the DC/DC converters 9 and 14 allows the potential near a potential detecting terminal to increase and the other DC/DC converter is then similarly operated, a potential is set to be higher than that set by the one DC/DC converter. Although one DC/DC converter performs the operation for reducing the potential, the other DC/DC converter is similarly operated. Then, the operation of the one DC/DC converter is influenced from the operation of the other DC/DC converter, and the potential of the high-potential line is not stable. This state indicates the interference.

Then, the intermittent connection prevents the interference because of the following reason. First, the control operation from one DC/DC converter is influenced to all the circuits during the disconnection. Thereafter, the other DC/DC converter performs the control operation depending on the result of the one DC/DC converter. Then, the other DC/DC converter does not increase the potential. Therefore, the above-mentioned interference is not caused.

Second Embodiment

The second embodiment relates to a semiconductor circuit system comprising: an LSI having a plurality of power supply systems that can independently set the potentials thereof and a connecting circuit that connects the power supply systems; a power supply circuit that supplies power to the LSI; and a circuit that controls the power supply circuit. Further, the connecting circuit intermittently connects the power supply systems having the same potential synchronously with a clock.

Figure 10:
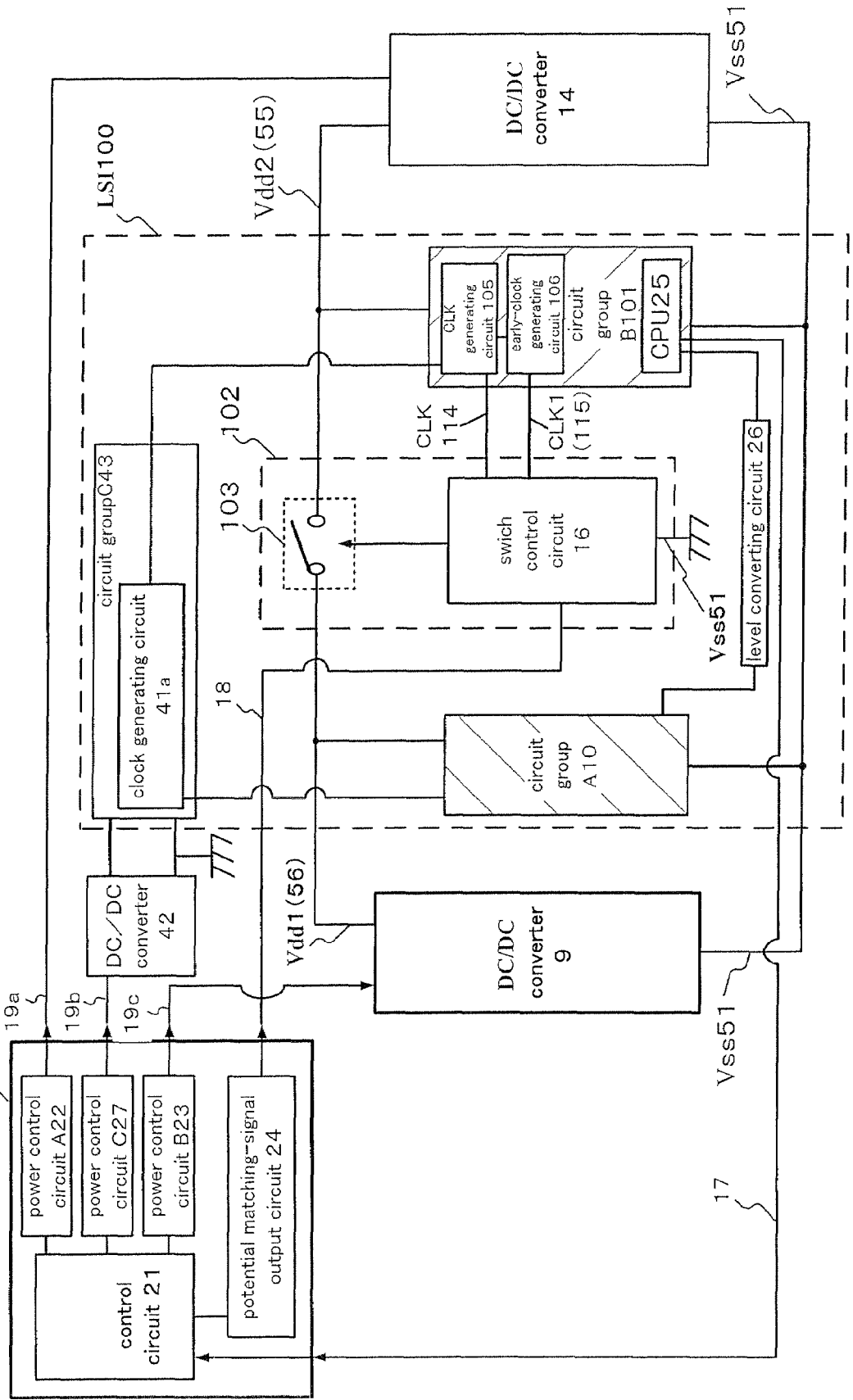
FIG. 10 is a diagram showing one example of the details of an LSI according to the second embodiment.

FIG. 10 is a diagram showing the details of an LSI 100 according to the second embodiment. Further, FIG. 10 shows the LSI 100, the DC/DC converters 9 and 14, the DC/DC converter 42, and a control circuit 20. The circuits are connected by using the high-potential line Vdd 1 (56), the high-potential line Vdd 2 (55), the ground potential line Vss 51, the control signal 17, the potential matching signal 10, and the clock 41b.

The LSI 100 comprises: the circuit groups A10, B101, and C43; a connecting circuit 102; and the level converting circuit 26.

Herein, the DC/DC converters 9, 14, and 42 are similar to those as described above with reference to FIG. 2. Further, the circuit groups A10 and C43 and the level converting circuit 26 are also similar to those as described above with reference to FIG. 3.

However, the circuit group B101 comprises a CLK generating circuit 105 that generates a clock (CLK 114) and an early-clock generating circuit 106 that generates an early clock (CLK 1 (115)) in addition to the CPU 25. Further, the CPU 25 controls the operation of the circuit group B101. Furthermore, the CPU 25 is connected to the circuit group A10 via the level converting circuit 26, and controls the operation of the circuit group A10. Therefore, the CPU 25 grasps the operation ratios of the circuit groups A10 and B101. Moreover, the CPU 25 outputs the control signal 17 to the control circuit 20 so as to perform the voltage control operation based on the above operation ratios.

The CLK generating circuit 105 generates a clock for the circuit group B101 by using the clock 41b for the system, output from the clock generating circuit 41a, i.e., the CLK 114. The CLK generating circuit 105 comprises a divider and a circuit that amplifies a clock from the divider.

The early-clock generating circuit 106 outputs a signal having delay clock from the CLK generating circuit 105, as the early clock, i.e., the CLK 1 (115). The early-clock generating circuit 106 delays the phase of the signal, and comprises a plurality of inverters. The early clock has an early phase with respect to the clock. Further, the clock is delayed by 180° or more, thereby generating the early clock. A rising edge of the clock in the next period is delayed by 360° from the rising edge of the clock. Therefore, the clock delayed by 180° or more becomes the early clock for the clock in the next period.

Figure 11:
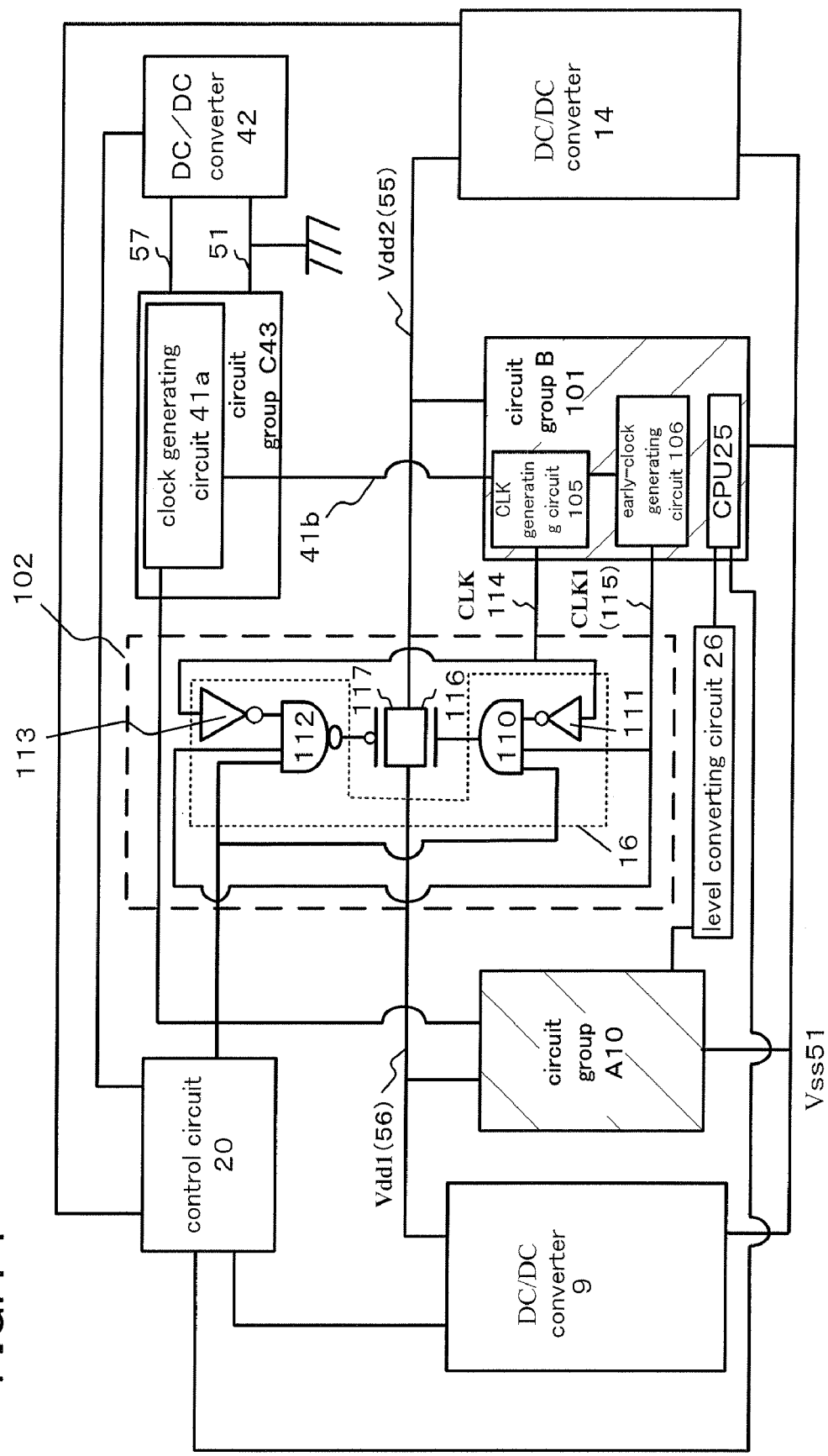
FIG. 11 is a diagram showing another example of the details of the LSI according to the second embodiment.

FIGS. 11 and 12 are diagrams showing an example of specific circuits of the connecting circuit 102 shown in FIG. 10 and an example of operation waveforms of the circuits.

FIG. 11 is a diagram specifically showing the LSI 100 according to the second embodiment. Herein, circuits other than the connecting circuit 102 are similar to those described with reference to FIG. 10.

The connecting circuit 102 comprises: a switch circuit 103; an inverter circuit 111; a 3-input AND circuit 110; a 3-input NAND circuit 112; and an inverter circuit 113.

The inverter circuit 111 outputs an inverse signal to a first input terminal of the 3-input AND circuit 110 in response to the CLK 114.

The CLK 114 is generated by the CLK generating circuit 105 in the circuit group B101.

The 3-input AND circuit 110 receives the CLK 1 (115) from a second input terminal in response to the inverse signal of the CLK 114 from the first input terminal, and receives the potential matching signal 18 from the control circuit 20 from a third input terminal. Further, the 3-input AND circuit 110 outputs, from an output terminal thereof, a pulse signal having pulses of the "H" logic to a gate terminal of an NMOS transistor 116.

The CLK 1 (115) is an early clock generated by the early-clock generating circuit 106 in the circuit group B101.

The inverter circuit 113 receives the CLK 114, and outputs the inverse signal to a first input terminal of the 3-input NAND circuit 112.

The 3-input NAND circuit 112 receives an inverse signal of the CLK 114 from the first input terminal, receives the CLK1 (115) from the second input terminal from the third input terminal, and further receives the potential matching signal 18 from the control circuit 20. In addition, the 3-input NAND circuit 112 outputs a pulse signal having a pulse of the "L" logic to a gate terminal of a PMOS transistor 117 from the output terminal thereof.

The switch circuit 13 is a transfer circuit formed by connecting the PMOS transistor 117 and the NMOS transistor 116 in parallel therewith. The gate terminal of the PMOS transistor 117 is connected to the output terminal of the 3-input NAND circuit 112. The gate terminal of the NMOS transistor 116 is connected to an output terminal of the 3-input AND circuit 110. One end of the transfer circuit is connected to the high-potential line Vdd 1 (56) of the power supply system connected to the circuit group A10. The other end of the transfer circuit is connected to the high potential line Vdd 2 (55) of the power supply system connected to the circuit group B101.

FIG. 12 is a diagram showing operation waveforms of the connecting circuit 12 according to the second embodiment. Further, FIG. 12 shows an operation waveform 120 of the CLK 114, an operation waveform 121 of the CLK 1 (115), an operation waveform 122 of gate terminal of the NMOS transistor 116, and an operation waveform 123 of the gate terminal in the PMOS transistor 117. The following will describe the operation of circuits forming the connecting circuit 102 in accordance with the description of the operation waveforms 120, 121, 122, and 123.

The operation waveform 120 indicates the change in potential of the CLK 114 having a predetermined period. The operation waveform 121 indicates the change in potential of a clock, i.e., the CLK 1 (115) having a phase earlier than the CLK 114.

The operation waveform 122 indicates a waveform of a pulse signal having a pulse of the "H" logic synchronous with a rising edge of the CLK 1 (115). Because, the 3-input AND circuit 110 receives an inverse signal of the CLK 114 from a first input terminal, the CLK 1 (115) from a second input terminal, and the potential matching signal 18 from a third input terminal. Therefore, during receiving the potential matching signal 18, the 3-input AND circuit 110 outputs a pulse signal having a pulse of the "H" logic, synchronously with the rising edge of the CLK 1 (115).

The operation waveform 123 indicates a pulse of a pulse signal having the "L" logic, synchronously with the rising edge of the CLK 1 (115). Because the 3-input NAND circuit 112 receives the inverse signal of the CLK 114 from a first input terminal, the CLK 1 (115) from a second input terminal, and the potential matching signal 18 from a third input terminal. Therefore, the 3-input NAND circuit 112 outputs a pulse signal having a pulse of the "L" logic, synchronously with the rising edge of the CLK 1 (115) during receiving the potential matching signal 18.

Then, during a period for which the pulse signal having the "L" logic potential and the pulse signal having the "H" logic potential are received to the gate terminals of the PMOS transistor 117 and of the NMOS transistor 116, the transfer circuit connects the high-potential line Vdd 1 (56) of the circuit group A10 to the high-potential line Vdd 3 (55) of the circuit group B101. In other words, when the transfer circuit receives the potential matching signal 18, the connecting circuit 102 intermittently connects the high-potential lines of the power supply system having the same potential, synchronously with the clock (the CLK 114).

Then, the potentials of the high-potential line Vdd 1 (56) and the high-potential line Vdd 2 (55) connected to each other are stable. On the other hand, since the high-potential line Vdd 1 (56) is intermittently connected to the high-potential line Vdd 2 (55), it is possible to prevent the interference of the DC/DC converters that control the potentials of the high-potential lines.

What is claimed is:

1. A semiconductor integrated circuit comprising:
   a first power supply having first potential controlled under control operation from an external control circuit;
   a second power supply having second potential controlled under control operation from the external control circuit, and the second potential being set independently of the first power supply;
   a first power-supply system comprising a circuit driven by the first power supply;
   a second power-supply system comprising a circuit driven by the second power supply; and
   a connecting circuit performing connecting operation between a first high-potential line of the first power-supply system and a second high-potential line of the second power-supply system in response to a potential-matching signal indicating that the first power-supply system and the second power-supply system are operated by the same potential from the external control circuit, wherein the connecting circuit comprises:
   a pulse circuit receiving the potential-matching signal and a clock signal, and outputting a first pulse signal;
   a monitoring circuit monitoring the ground potential of the first power-supply system or the second power-supply system during a pulse period of the first pulse signal, and outputting a second pulse signal having a second-pulse period corresponding to a changing period of the ground potential; and
   a switch receiving the second pulse signal to a gate terminal thereof and connects the first high-potential line of the first power-supply system to the second high-potential line of the second power-supply system during the second-pulse period of the second pulse signal.

2. The semiconductor integrated circuit according to claim 1, wherein the monitoring circuit monitoring the ground potential of the first power-supply system or the second power-supply system by comparing a ground potential just after input from a terminal connected to an external-ground power supply with the ground potential of the first power-supply system or the second power-supply system.

3. The semiconductor integrated circuit according to claim 1, wherein the monitoring circuit monitoring the ground potential of the first power-supply system or the second power-supply system by comparing a ground potential from a terminal connected to an external-ground power supply arranged to the first power-supply system or the second power-supply system arranged independently of a terminal for supplying the external-ground potential with the ground potential of the first power-supply system or the second power-supply system.

4. The semiconductor integrated circuit according to claim 2, further comprising:
   a third power-supply system driven by a third power supply having a constant potential; and
   a first-clock generating circuit belonging to the third power-supply system,
   wherein the clock signal it output from the first-clock generating circuit.

5. The semiconductor integrated circuit according to claim 3, further comprising:
   a third power-supply system driven by a third power supply having a constant potential; and
   a first-clock generating circuit belonging to the third power-supply system,
   wherein the clock signal it output from the first-clock generating circuit.

6. The semiconductor integrated circuit according to claim 1, wherein the switch is a PMOS transistor.

* * * * *